I. N. RICHARDSON,

Assignor to I. W. Richardson.

PLAYING-CARDS.

No. 7,757.

Reissued June 19, 1877.

WITNESSES.

Samuel D. Kelley,

James A. Todd.

INVENTOR.

Ivory N. Richardson

By Porter & Hutchinson Atty.

UNITED STATES PATENT OFFICE.

IVORY N. RICHARDSON, OF MALDEN, MASSACHUSETTS, ASSIGNOR TO IVORY W. RICHARDSON.

IMPROVEMENT IN PLAYING-CARDS.

Specification forming part of Letters Patent No. 155,752, dated October 6, 1874; reissue No. 7,757, dated June 19, 1877; application filed March 13, 1876.

DIVISION No. 3.

*To all whom it may concern:*

Be it known that I, IVORY N. RICHARDSON, late of Revere, but now of Malden, in the Commonwealth of Massachusetts, have invented an Improvement in Playing-Cards; of which the following is a specification:

This invention relates to an improvement in that class of cards known as "playing-cards," which are divided into suits or subdivisions, and having upon each card certain emblems, faces, or pictures, which indicate the suit to which such card belongs, as also its size or value relatively to the other cards in the pack; and the invention consists in a distinguishing or indicating color, which is a "ground color" for each suit of cards, such as black for "spades," red for "hearts," green for "clubs," and yellow for "diamonds," together with figures, numerals, or other indicators, placed preferably at the edge or border of the card, which numeral or indicator shall show the size or value of the card; whereby the player, as soon as his eye catches such numeral or indicator upon any card and the ground color of the card, will, by such color and indicator, at once know of which suit it constitutes a part and what is its size or value, without the necessity, as heretofore, of discerning the configuration of the emblems on the cards or the number thereof. Beside which the figures, emblems, faces, pictures, or other characters printed on such cards may all be in one color, thereby greatly reducing the cost of appliances for printing such cards and diminishes the cost thereof, as such cards will be cut directly from sheets of paper of the requisite color, which color is imparted to the sheets during the manufacture thereof; whereas in cards having merely a distinguishing color, as heretofore, the colors are printed on by a separate and additional operation, increasing the expense and involving the trouble of registration of one color upon another, or upon the figures of the cards.

Figure 1:
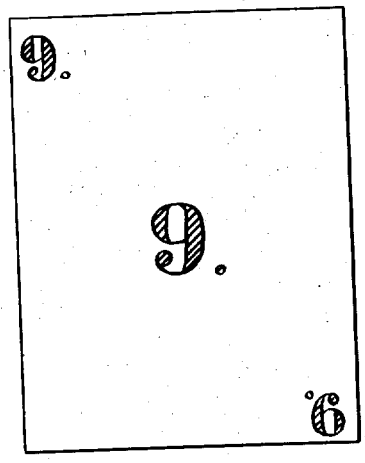
Figure 2:
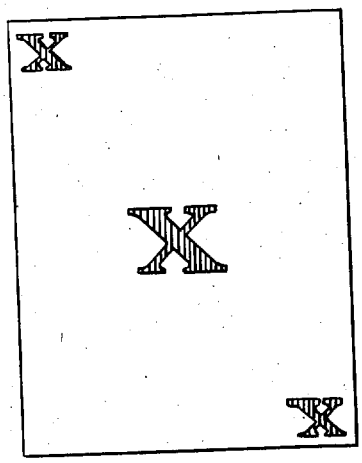
Figure 3:
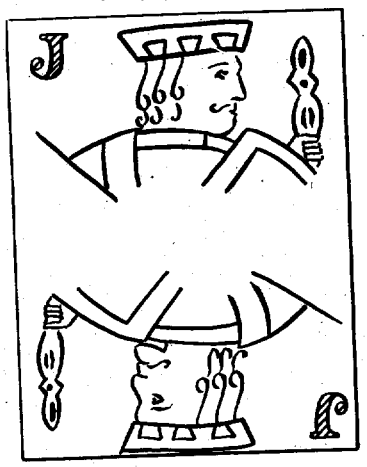
Figure 4:
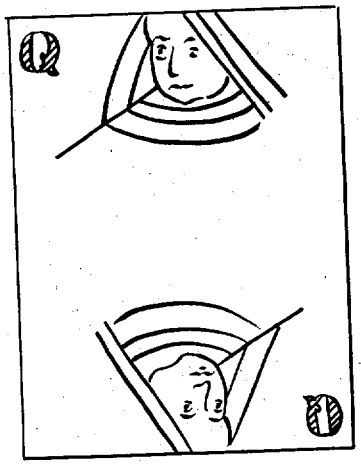

In the accompanying drawings, Figure 1 represents the nine of hearts. Fig. 2 represents the ten of clubs. Fig. 3 represents the jack or knave of spades, and Fig. 4 represents the queen of diamonds.

In said Fig. 1 the ground of the card is red, indicating that it belongs to the suit known as "hearts," while the numeral 9 thereon indicates the size or value of the card relatively to the other cards in the pack.

In Fig. 2 the ground of the card is green, indicating that it belongs to the suit known as "clubs," while the numeral X thereon indicates its size or value, as the ten of clubs.

In Fig. 3 the ground is a dark purple, indicating that it belongs to the suit known as "spades," upon which is shown the letter J and the picture of a jack or knave. This ground color and said letter J, or the ground color and the effigy of the jack, may either be employed to indicate the suit and value of the card.

In Fig. 4 the ground of the card is yellow, indicating that it belongs to the suit known as "diamonds." Upon it is shown the letter Q and the picture of a queen. This color and said letter Q, or the color and the effigy of the queen, may be employed to indicate the suit and value of the card.

I do not confine myself to any prescribed ground color for each suit of cards, nor do I limit myself to any color for the figures, emblems, pictures, or faces of the cards.

The numerals and emblems, or the numerals alone, may be used on the emblematic cards, and the respective letters J for jack, Q for queen, and K for king, may alone be used on the picture-cards, or these letters and the corresponding effigies may be used on the picture or face cards, and the faces or heads, as well as the letters and figures, may be of any desired colors; but I prefer black therefor; and I also prefer to employ on the emblematic cards only the figures indicating their size or value, and on the cards representing the picture-cards only the respective letters referred to.

I do not claim, broadly, either the employment of a distinguishing color for each suit of cards, nor do I claim the use of numerals to indicate the size or value of the cards; but What I do claim is—

Playing-cards each suit whereof is indicated by a distinguishing ground color of the face thereof, and provided with numerals or letters to indicate the size or value of the cards, substantially in manner as described and shown.

IVORY N. RICHARDSON.

Witnesses:
WM. H. HART,
EUGENE HUMPHREY.